United States Patent [19]
Cunningham et al.

[11] Patent Number: 6,043,942
[45] Date of Patent: Mar. 28, 2000

[54] SELECTABLE WRITE PRECOMPENSATION IN A DIRECT ACCESS STORAGE DEVICE (DASD)

[75] Inventors: Earl Albert Cunningham; Peter J. Windler, both of Rochester, Minn.

[73] Assignee: International Business Machines Corporation, Armonk, N.Y.

[21] Appl. No.: 08/948,093

[22] Filed: Oct. 9, 1997

[51] Int. Cl.[7] ........................................ G11B 5/09
[52] U.S. Cl. ........................................ 360/45
[58] Field of Search ................. 360/45, 46; 369/59, 369/60; 341/180; 375/285, 296, 348

[56] References Cited

U.S. PATENT DOCUMENTS

| | | | |
|---|---|---|---|
| 4,021,853 | 5/1977 | Murphy | 360/45 |
| 4,964,107 | 10/1990 | Galbraith et al. | 360/51 |
| 5,184,256 | 2/1993 | Chikusa | 360/45 |
| 5,249,086 | 9/1993 | Sharma | 360/45 |
| 5,517,146 | 5/1996 | Yamasaki | 360/46 |

OTHER PUBLICATIONS

Philpott et al., "A 7 MB/Sec (65 Mhz), Mixed Signal, Magnetic Recording Channel DSP Using Partial Response Signalling With Maximum Likelihood Detection," IEEE Custom Integrated circuits Conference, 1993, pp. 10.4.1–10.4.4.

*Primary Examiner*—W. Chris Kim
*Attorney, Agent, or Firm*—Joan Pennington; Christopher Lynt

[57] ABSTRACT

A method and apparatus for write precompensation in a direct access storage device are provided. A data write encoder generates a data signal to be written. A write precompensation delay circuit is coupled to the data encoder for receiving and delaying the data signal. The write precompensation delay circuit includes a first delay path and a second delay path in parallel with the first delay path. The first delay path and the second delay path have different delay values. In one arrangement, both the first delay path and the second delay path include a plurality of delay cells connected together in a chain. The delay cells of the first delay path have a first predetermined delay value and the delay cells of the second delay path have a second predetermined delay value. A ratio of the second predetermined delay value to the first predetermined value is set equal to one of approximately 3/2, 4/3, 5/4, 6/5, or 7/6. In another arrangement, a first delay path includes a plurality of delay cells connected together in a chain and a plurality of delay cells connected in parallel provide multiple parallel delay paths.

12 Claims, 7 Drawing Sheets

SELECTABLE WRITE PRECOMPENSATION IN A DIRECT ACCESS STORAGE DEVICE (DASD)

FIELD OF THE INVENTION

The present invention relates to writing data on a magnetic disk surface, and more particularly to a method and apparatus for write precompensation in a direct access storage device.

DESCRIPTION OF THE RELATED ART

When writing disk drive data at high densities, a phenomena called nonlinear bit shift occurs. This happens when the magnetic field of one magnet interferes with the write head field writing the change from the first magnet to the next magnet, causing the first magnet to be written with a length shorter than desired. To compensate for this, data channel designers delay the write signal by some variable amount, causing the data to be written in the correct locations.

In known arrangements, the electrical write signal has been delayed by passing it through a variable delay line of multiple unit delay cells, and then choosing some point along the chain with the number of cells for the appropriate delay. With increasing speeds and densities in, however this approach is not so effective for three main reasons. First the delay per cell is fixed, whereas the data rate is not. This means that the delay granularity is better when the data rate is low, but worse when it is high. Second, the amount of power and size required to get the delay per cell low enough to keep the current single-chain architecture is very large, and gets worse with higher and higher data rates. Third, each time the data rate of the product is changed, the delay per cell has to be scaled to reflect such changed data rate.

A need exists for an improved method and apparatus for write precompensation in a direct access storage device. A need exists to provide such write precompensation apparatus with low power and low area and having finer delay granularity or shorter delay per delay cell and more delay values or a larger number of delay steps.

SUMMARY OF THE INVENTION

A principal object of the present invention is to provide an improved write precompensation apparatus. Other objects are to provide such write precompensation apparatus for writing data in a direct access storage device; to provide such write precompensation apparatus substantially without negative effects and that overcome many of the disadvantages of prior art arrangements.

In brief, a method and apparatus for write precompensation in a direct access storage device are provided. A data write encoder generates a data signal to be written. A write precompensation delay circuit is coupled to the data encoder for receiving and delaying said data signal. The write precompensation delay circuit includes a first delay path and a second delay path in parallel with the first delay path. The first delay path and the second delay path have different delay values.

In accordance with features of the invention, both the first delay path and the second delay path include a plurality of delay cells connected together in a chain. The delay cells of the first delay path have a first predetermined delay value and the delay cells of the second delay path have a second predetermined delay value. A ratio of the second predetermined delay value to the first predetermined value is set equal to one of approximately 3/2, 4/3, 5/4, 6/5, or 7/6. In another arrangement, the first delay path includes a plurality of delay cells connected together in a chain and a plurality of delay cells connected in parallel provide multiple parallel delay paths.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
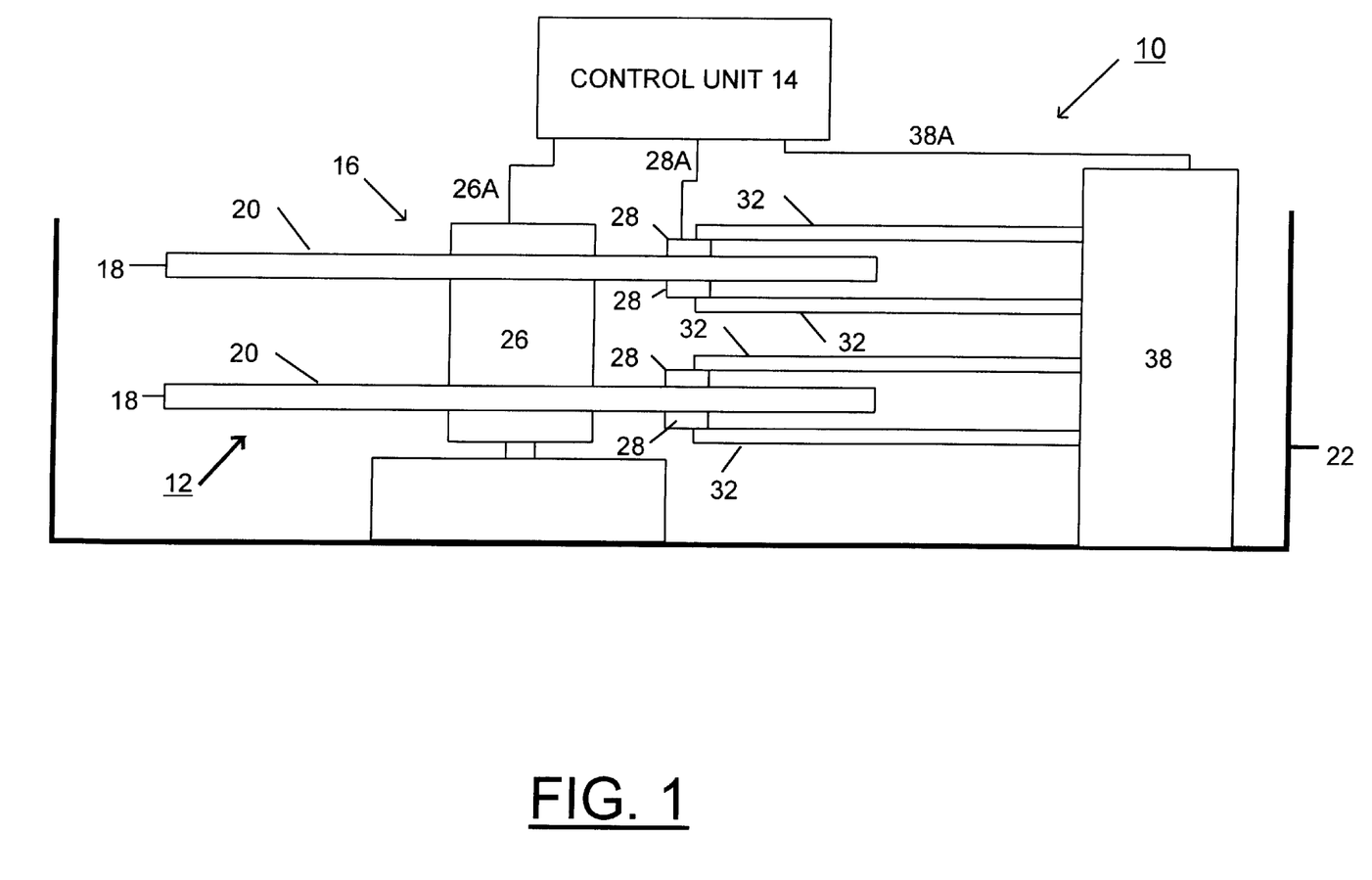
FIG. 1 is a schematic and block diagram of a data storage disk file embodying the present invention.

Having reference now to the drawings, in FIG. 1 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head 28 is mounted on a flexure spring (not shown) carried by an arm 32. The arms 32 are ganged together for simultaneous pivotal movement driven in pivotal movement by a head drive servo motor 38 including a voice coil (not shown) cooperating with an internal magnet and core assembly. Drive signals applied to the voice coil cause the arms 32 to move in unison to position the transducer heads 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer heads over corresponding lines 28A, one of which is seen in FIG. 1. Servo position information is recorded on the disk surfaces 20, and the transducer heads 28 read this servo information to provide a servo position signal to the control unit 14. This information is employed by the control unit 14 to provide position control signals on line 38A. The purpose of this position feedback system is to assure accurate and continuous positioning of the transducer heads 28 so that data is written to and read from precise locations on the disk surfaces 20.

Figure 2:
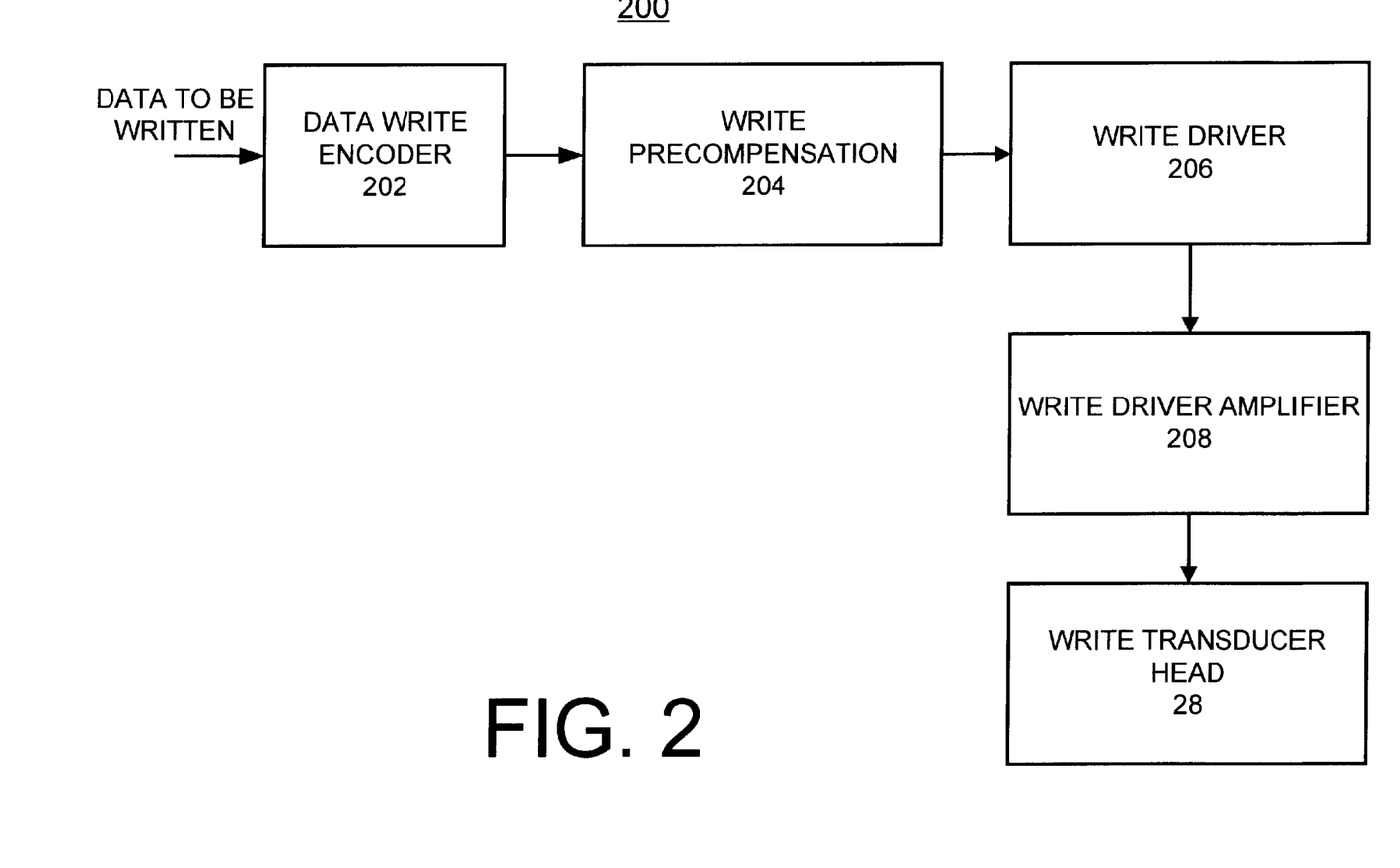
FIG. 2 is a block diagram illustrating a data write channel of the data storage disk file of FIG. 1 including write precompensation apparatus of the present invention.

In FIG. 2, an exemplary data write channel generally designated as 200 of the disk drive unit 12 is shown. A data write encoder 202 encodes a data signal for data to be written. The data signal is applied to a write precompensation (precomp) circuit 204 and provides a precompensation data signal to a write driver 206. A write precompensation apparatus of the present invention, as illustrated and described with respect to FIGS. 3B, 3C, 3D and 4, is used for the write precompensation circuit 204. The data signal applied to the precomp circuit 204 is delayed by the appropriate amount, then buffered off of the chip by the write driver 206 which has high capacitive drive ability. This signal directly writes magnetic bits by sending current from an amplifier 208 carried by the arm 32 through an inductive transducer write head 28. The amplified data write signal from the write driver amplifier 208 drives the write transducer head 28.

Figure 3A:
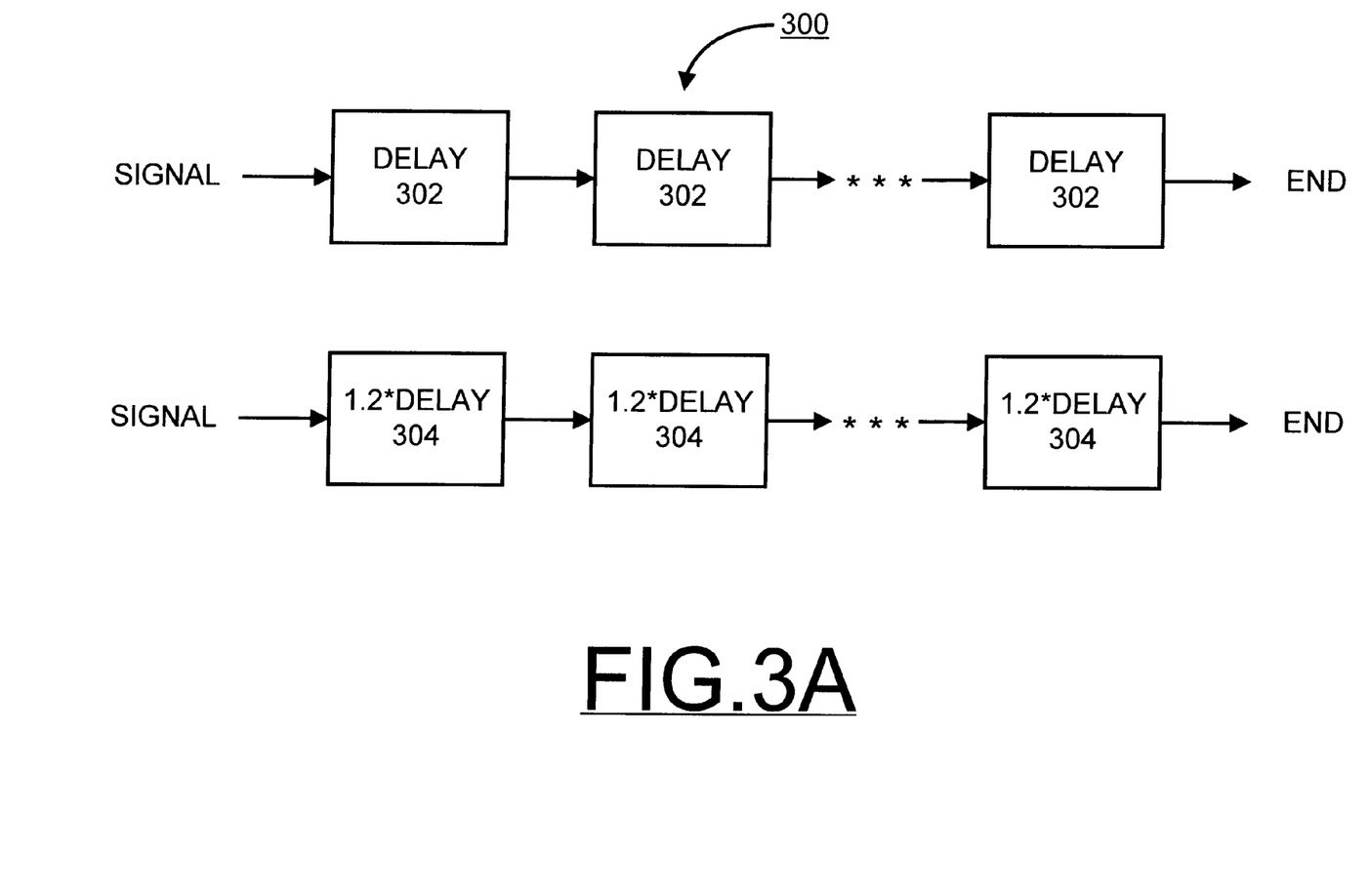
FIGS. 3A, 3B, 3C, and 3D are block diagram representations of write precompensation apparatus of the present invention.

Referring to FIG. 3A, there is shown write precompensation apparatus generally designated by 300 of the present invention. Write precompensation apparatus 300 includes two parallel chains or delay paths of multiple delay cells 302 and 304. As indicated in FIG. 3A, the second chain of delay cells 304 have a delay of 1.2 times the delay of the delay cells 302 in the first chain.

Figure 3B:
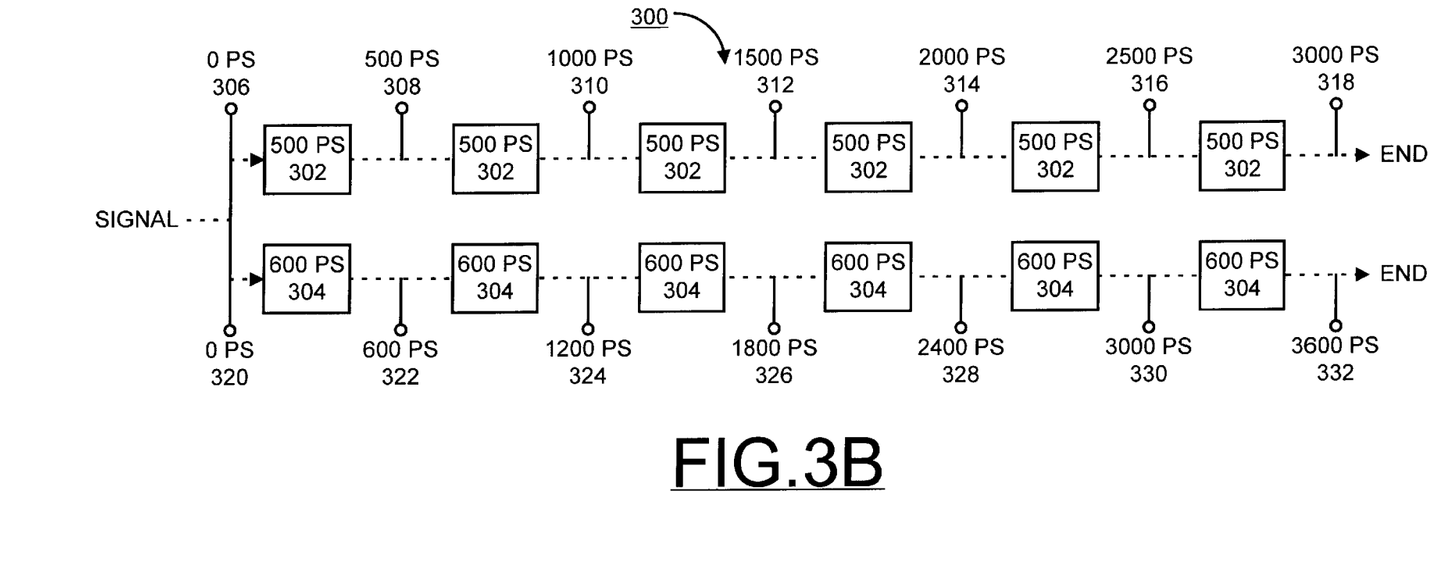

Referring to FIG. 3B, an exemplary write precompensation circuit 300 including a first delay path of delay cells 302 of 500 pico-seconds (ps) and a second delay path of delay cells 304 of 600 ps. The first delay path or chain of delay cells 302 include a plurality of taps 306, 308, 310, 312, 314, 316, 318. The second delay path or chain of delay cells 304 include a plurality of taps 320, 322, 324, 326, 328, 330, and 332. A data signal is applied to a first delay cell 302 and 304 at respective taps 306 and 320 in the first and second delay paths. Delays in increments of 100 ps, from zero to 600 ps may be obtained by using taps directly across the two delay paths including 306 and 320, 308 and 322, 310 and 324, 312 and 326, 314 and 328, 316 and 330 and 318 and 332. For 300 ps, the ON TIME transition is taken from the tap 312, that is 1500 ps from the reference and the PRECOMP TIME is taken from the tap 326 which is 1800 ps from the reference, or 300 ps later than the ON TIME signal. Larger values are obtained by using a second delay path tap, such as tap 322, 324, or 326, one or more increments to the right of the first delay path tap, such as tap 306 or 308. For example, using taps 322 and 306 adds 600 ps to the total delay. The largest delay with one tap offset, is provided by taps 316 and 332, which is from 2500 ps to 3600 ps, or 1100 ps difference. For 1200 ps delay, two offsets, from tap 306 to tap 324 is used, or from 0 ps to 1200 ps. The largest delay with a two tap offset, is from tap 314 to tap 332, or from 2000 ps to 3600 ps, for a 1600 ps difference.

The following table 1 illustrates sixteen precompensation (precomp) delay values for steps 0 through 15 from zero to 15 units with a 4 bit selection using a clock frequency (F) of 166.7 MHz and clock time (T) of 6000 ps and the write precompensation circuit 300 of FIG. 3B.

TABLE 1

| STEP | 1 tap vs 2 tap delay amount | | % bit | precomp |
|---|---|---|---|---|
| 0 | 306 vs 320 | O.0d | 0% | 0 ps |
| 1 | 308 vs 322 | O.2d | 1.67% | 100 ps |

TABLE 1-continued

| STEP | 1 tap vs 2 tap delay amount | | % bit | precomp |
|---|---|---|---|---|
| 2 | 310 vs 324 | O.4d | 3.33% | 200 ps |
| 3 | 312 vs 326 | O.6d | 5.00% | 300 ps |
| 4 | 314 vs 328 | O.8d | 6.67% | 400 ps |
| 5 | 316 vs 330 | 1.Od | 8.33% | 500 ps |
| 6 | 306 vs 322 | 1.2d | 10.0% | 600 ps |
| 7 | 308 vs 324 | 1.4d | 11.67% | 700 ps |
| 8 | 310 vs 326 | 1.6d | 13.22% | 800 ps |
| 9 | 312 vs 328 | 1.8d | 15.0% | 900 ps |
| 10 | 314 vs 330 | 2.Od | 16.67% | 1000 ps |
| 11 | 316 vs 332 | 2.2d | 18.33% | 1100 ps |
| 12 | 306 vs 324 | 2.4d | 20.0% | 1200 ps |
| 13 | 308 vs 326 | 2.6d | 21.67% | 1300 ps |
| 14 | 310 vs 328 | 2.8d | 23.33% | 1400 ps |
| 15 | 312 vs 330 | 3.Od | 25.0% | 1500 ps |

It should be understood that significantly more precomp levels are available, while some increments may not be available. With the exemplary write precompensation circuit 300 of FIG. 3B, there are 17 levels (0–16) of precomp available and 16 levels used with 4 bit addressing. In the exemplary write precompensation circuit 300 of FIG. 3B, 1700 ps would not be available. Adding one more 600 ps delay section 304 would allow 1700 ps, and each increment up to 2200 ps. With a second 600 ps delay section 304 is added, then all increments up to 2800 ps are available. With a third 600 ps section 304, then all increments to 3400 ps are available. Note that additional 500 ps delay sections 302 are not required to provide these additional precomp levels. Thus with 3 additional delay sections 304 or 6 delay sections 302 and 9 delay sections 304 for a total of 15 delay sections, 35 continuous levels of precomp are available, of which 32 can be addressed with 5 bits. The write precompensation circuit 300 of FIG. 3B provides small delay granularity with cells 302 and 304 having large delay.

In accordance with features of the invention, more delay steps per number of delay cells 302, 304 are provided with the parallel delay path architecture than with a conventional single chain architecture, provided the correct delay ratio is set. Note that this delay ratio must be a ratio of integers in order to wrap back around as in the code 5 to 6 transition of FIG. 3B. In this example of FIG. 3B, a ratio of 6/5 is used, but 3/2, 4/3, 5/4, or 7/6 also can be used. The closer the ratio is to unity, more granularity is provided, while a larger number of delay cells are used.

Figure 3C:
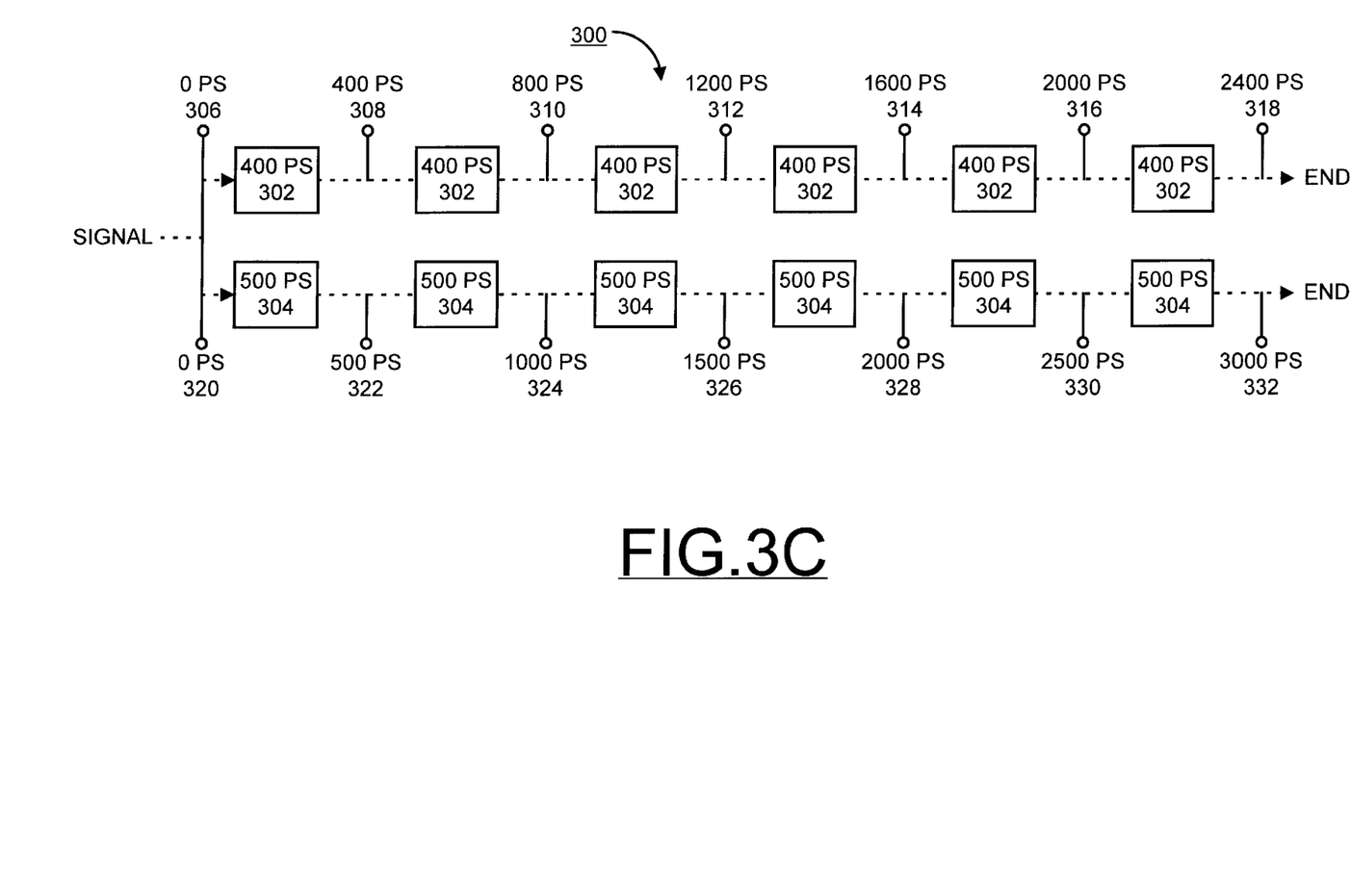

Referring to FIG. 3C, there is shown another exemplary write precompensation circuit 300 with a first delay path of 400 ps delay sections or cells 302 and a second delay path of 500 ps delay cells 304. There are 19 continuously available levels of precomp available with this system 0–18, illustrated as 0–1800 ps with 100 ps increments. It should be understood that the last two 400 ps cells are not needed, thus requiring only 10 delay cells, 4 delay cells 302 and 6 delay cells 304 to obtain 18 levels of precomp. For this example, fewer cells are required, but the cells 302 and 304 must be smaller, the minimum being 400 ps to obtain 100 ps increments, versus 500 ps minimum in the example of FIG. 3B. The adjusting current for the 400 ps cells 302 will be about 1.25 times the current for the 500 ps cells.

Figure 3D:
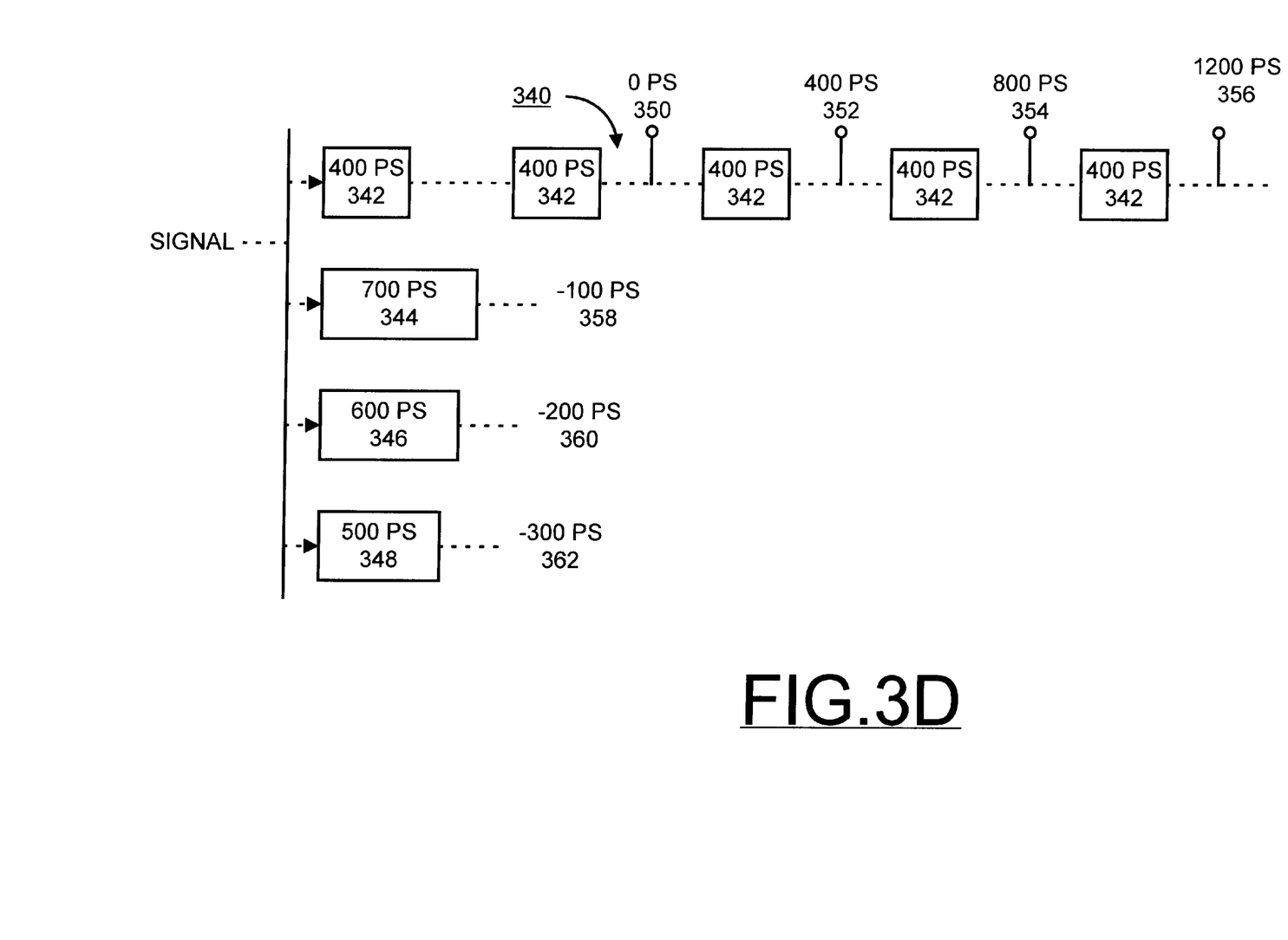

Referring to FIG. 3D, there is shown another write precompensation circuit generally designated by 340 of the present invention. A first upper chain of delay cells 342 is formed with 5 delay cells of for example, 400 ps. The plurality of delay cells 344, 346, and 348 respectively form a second delay path, a third delay path and a fourth delay path. The delay cells 344, 346, and 348 respectively have a delay value of 700 ps, 600 ps, and 500 ps. A zero time reference may be considered the time after two of cells 342 in the first path as shown at a tap 350. The second, third, and fourth delay paths are made up of one cell each. The delay times of the three cells 344, 346, and 348 are adjusted relative to the first path delay, by using a fraction of the adjusting current of the first chain. For example, with an adjusting current of Io for the first delay cell 342, the approximate currents respectively are 0.571* Io, 0.667* Io, and 0.800* Io for the three cells 344, 346, and 348. The current for the second chain is adjusted to 1.75 times smaller, or 0.571 of the adjusting current Io of the first chain. The delay time of the second path is about 1.75 times longer than the example value of 400 ps or about 700 ps. At a tap 358 at the output of delay cell 344, this is 100 ps earlier than the two 400 ps delays at the tap 350 which is 800 ps from the input reference signal applied to the first delay cell 342 in the first delay chain. The third delay path is set to 2/3 the adjusting current Io of the first chain, giving a delay of about 600 ps, or 200 ps earlier than the zero reference at a tap 360. The fourth delay path is run at 0.8 of the current of the first chain, giving a delay of about 500 ps, at a tap 362, which is 300 ps earlier than the zero reference time at tap 350.

The delays of 400 ps per delay section 342 at taps 352, 354, and 356 to the right of the reference tap 350 in the first chain, can be represented with 2 higher order bits of time adjustment. The second, third, and fourth delay paths being 100, 200, and 300 ps before the zero reference time at respective taps 358, 360 and 362 and the zero time point or tap 350 of the first chain can be represented by 2 lower order bits of time delay adjustment. The write precompensation circuit 340 then represents 4 bits of precomp selection (0–15 units), in 100 ps increments from zero to 1500 ps. Note that there is never more than one delay cell of the second, third, or fourth paths, so small errors in these values do not add up. Thus, the accuracy of these lower order bits is not too critical, but probably should be within +/−5%. Note that this form of precompensation circuit only uses 8 cells to obtain 16 values. Also note that each added delay section 342 in the top first chain produces four additional precomp values. Thus, 4 additional or 9 total cells 342 in the first delay chain, giving a total of 12 cells with the three delay cells 344, 346 and 348 of the second, third and fourth delay paths, produce 32 levels, for 5 bits of addressed values.

Figure 4:
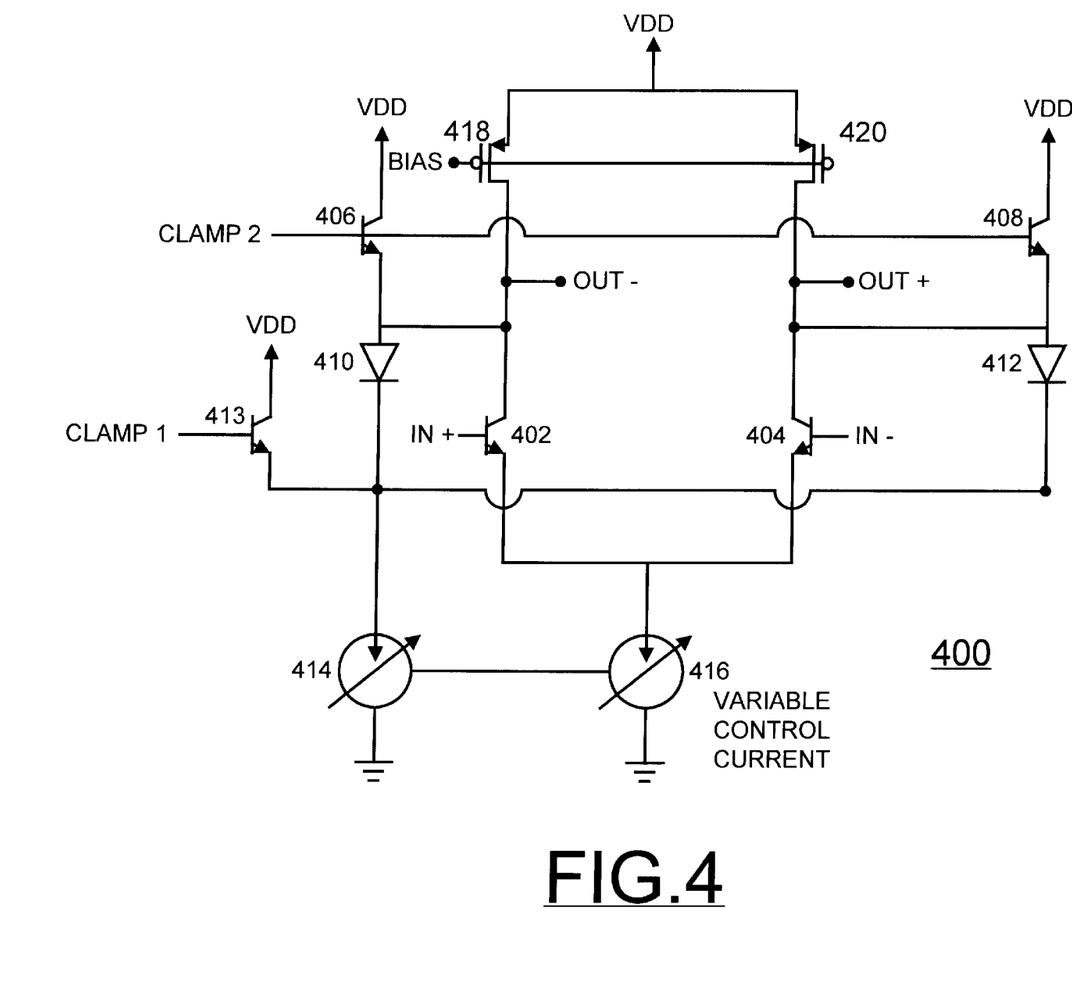
FIG. 4 is a schematic diagram representation of an exemplary delay cell or section of the write precompensation apparatus of the present invention.

Referring to FIG. 4, there is shown an exemplary delay cell or section generally designated by 400 of the write precompensation apparatus 300 and 340 of the present invention. Delay cell 400 advantageously have the same internal circuitry as conventional write VCO delay cells in the data storage disk file 10. The stages use current to control their delay. The more current, the less delay, according to the equation I=C*dv/dt. In the delay stage 400, an input signal is applied to the base of a respective NPN transistor 402 and 404. The NPN transistors 402 and 404 form a differential pair with a pair of NPN transistors 406 and 408. A clamp input signal, CLAMP 1, is applied to the base of the NPN transistor 413. A clamp input signal, CLAMP 2, is applied to the base of the NPN transistors 406 and 408 to provide a voltage reference and limit the signal range for linear operation. A respective diode 410 and 412 is connected between the emitter of NPN transistor 413 and respective NPN transistor 406, 408 to a matched pair of variable control current sources 414 and 416. A bias input is applied to the gate of a pair of field effect transistors 418 and 420 connected to the stage output at the collectors of the NPN transistors 402 and 404. The output of delay cell 400 is applied to an OR function (not shown). These stages 400 advantageously are used because the control current to delay ratio is generally linear. The delay ratio of one chain to another, such as delay cells 304 to delay cells 302, is set to 1.2 at a slow data rate with low control current. This ratio also is maintained at 1.2 at a high data rate with high control current. If delay does not scale linearly with current, this ratio will not keep a constant 1.2 over the entire data rate range. The delay cell 400 maintains the step sizes and the ability to wrap back around for further delay steps over the entire data rate range.

Another problem that is solved by this architecture of write precompensation circuits 300 and 340 is that the delay per cell is no longer fixed. The delay cells 302, and 304 of write precompensation circuit 300 and the delay cells 342, 344, 346, and 348 of write precompensation circuit 340 can have more delay due to this new architecture of the invention. The delay per cell is controlled by the write VCO, and the delay amount scales linearly with data rate. The delay cells 400 have a charging current that is set using current sources 414 and 416 to adjust the delay time. A higher current charges the parasitic capacitance of FETs 418 and 420 faster, and shortens the delay time. A lower current causes a longer delay due to a slower charge rate. Another advantage of this architecture of write precompensation circuits 300 and 340 is that each time that the channel data rate changes, the precomp does not have to be redesigned.

While the present invention has been described with reference to the details of the embodiments of the invention shown in the drawing, these details are not intended to limit the scope of the invention as claimed in the appended claims.

What is claimed is:

1. An apparatus for write precompensation in a direct access storage device comprising:

data encoder means for encoding a data signal to be written;

delay means coupled to said data encoder means for receiving and delaying said data signal, said delay means comprising a first delay path and a second delay path operated in parallel with said first delay path so that a desired write precompensation delayed data signal can be provide by a combination of delayed data signals from the first delay path and the second delay path; and said first delay path and said second delay path having different delay values.

2. An apparatus for write precompensation in a direct access storage device as recited in claim 1 wherein each of said first delay path and said second delay path including at least one delay cell and wherein said first delay path includes a plurality of delay cells connected together in a chain.

3. An apparatus for write precompensation in a direct access storage device as recited in claim 2 wherein each of said delay cells of said first delay path have a first predetermined delay value.

4. An apparatus for write precompensation in a direct access storage device as recited in claim 3 wherein said at least one delay cell of said second delay path having a second predetermined delay value, said second predetermined delay value is greater than said first predetermined delay value.

5. An apparatus for write precompensation in a direct access storage device as recited in claim 4 wherein said second delay path includes a plurality of delay cells connected together in a chain and wherein a ratio of said second predetermined delay value to said first predetermined value equals approximately 1.2.

6. An apparatus for write precompensation in a direct access storage device as recited in claim 4 wherein said second delay path includes a plurality of delay cells connected together in a chain and wherein a ratio of said second predetermined delay value to said first predetermined value equals approximately 6/5.

7. An apparatus for write precompensation in a direct access storage device as recited in claim 4 wherein said second delay path includes a plurality of delay cells connected together in a chain and wherein a ratio of said second predetermined delay value to said first predetermined value is set equal to one of approximately 3/2, 4/3, 5/4, 6/5, or 7/6.

8. An apparatus for write precompensation in a direct access storage device as recited in claim 1 wherein both said first delay path and said second delay path include a plurality of delay cells connected together in a chain.

9. An apparatus for write precompensation in a direct access storage device as recited in claim 8 wherein each said delay cell includes a differential pair of transistors receiving an input signal, a pair of field effect transistors (FETs) coupled to said differential pair of transistors and having parasitic capacitance, and a pair of variable control current sources coupled to the emitters of said differential pair of transistors for controlling the delay.

10. A direct access storage device comprising:

a disk surface for storing data;

data encoder means for encoding a data signal to be written;

write precompensation delay means coupled to said data encoder means for receiving and delaying said data signal, said delay means comprising a first delay path and a second delay path operated in parallel with said first delay path so that a desired write precompensation delayed data signal can be provided by a combination of delayed data signals from the first delay path and the second delay path; and said first delay path and said second delay path having different delay values; and transducer means coupled to said write precompensation delay means for receiving the desired write precompensation delayed data signal from the delay means and writing the data to the disk surface.

11. A direct access storage device as recited in claim 10 wherein said first delay path and said second delay path include a plurality of delay cells, wherein each of said delay cells of said first delay path have a first predetermined delay value and wherein each of said delay cells of said second delay path have a second predetermined delay value; and wherein a ratio of said second predetermined delay value to said first predetermined value is equal to one of approximately 3/2, 4/3, 5/4, 6/5, or 7/6.

12. A method for write precompensation in a direct access storage device comprising the steps of:

encoding a data signal to be written;

applying said encoded data signal to a precompensation delay circuit including a first delay path and a second delay path operated in parallel with said first delay path; said first delay path and said second delay path including a plurality of delay cells and a plurality of output signal taps for obtaining a respective delayed data signal therefrom; said first delay path and said second delay path having different delay values;

selecting predetermined output signal taps of said first and second delay paths for providing a delayed data signal by a combination of delayed data signals from the first delay path and the second delay path output signal taps.

* * * * *